United States Patent [19]

Sakurai et al.

[11] Patent Number: 4,656,000
[45] Date of Patent: Apr. 7, 1987

[54] NUCLEAR REACTOR

[75] Inventors: Mikio Sakurai, Mito; Shiro Nakamura, Hitachi; Takao Igarashi, Hitachi; Koki Yamauchi, Hitachi, all of Japan

[73] Assignee: Hitachi, Ltd., Tokyo, Japan

[21] Appl. No.: 673,365

[22] Filed: Nov. 20, 1984

Related U.S. Application Data

[63] Continuation of Ser. No. 344,222, Jan. 28, 1982, abandoned.

[30] Foreign Application Priority Data

Feb. 2, 1981 [JP] Japan ................................. 56-12941

[51] Int. Cl.4 ............................................. G21C 15/02
[52] U.S. Cl. .................................... 376/352; 376/353; 376/377
[58] Field of Search ............... 376/352, 377, 373, 406, 376/395, 399, 353

[56] References Cited

U.S. PATENT DOCUMENTS

| 2,982,713 | 5/1961 | Sankovich et al. | 376/352 |
|---|---|---|---|
| 2,994,657 | 8/1961 | Petrick | 376/377 |
| 3,041,264 | 6/1962 | Ricard | 376/377 |
| 3,060,111 | 10/1962 | Sherman et al. | 376/399 |
| 3,212,987 | 10/1965 | Mason | 376/352 |
| 3,255,089 | 6/1966 | Deighton | 376/406 |
| 3,284,312 | 11/1966 | West | 376/377 |
| 3,486,973 | 12/1969 | Georges et al. | 376/399 |
| 3,660,231 | 5/1972 | Fox et al. | 376/353 |
| 3,940,311 | 8/1976 | Frisch et al. | 376/353 |
| 3,954,560 | 5/1976 | Delafosse et al. | 376/442 |
| 4,050,986 | 9/1977 | Ference et al. | 376/353 |
| 4,132,115 | 1/1979 | Benemann et al. | 376/352 |
| 4,231,843 | 11/1980 | Myron et al. | 376/353 |
| 4,246,068 | 1/1981 | Lindner et al. | 376/373 |
| 4,303,474 | 12/1981 | Baxi | 376/352 |
| 4,348,355 | 9/1982 | Nylund | 376/448 |

FOREIGN PATENT DOCUMENTS 1244308  7/1967  Fed. Rep. of Germany ...... 376/377

Primary Examiner—Harvey E. Behrend
Attorney, Agent, or Firm—Antonelli, Terry & Wands

[57] ABSTRACT

A nuclear reactor having a reactor vessel adapted to be supplied with a coolant, a reactor core disposed in the reactor vessel and including a plurality of fuel assemblies, a plurality of control rods adapted to be inserted into the reactor core and a plurality of control rod driving devices for driving the control rods into and out of the reactor core. A plurality of tubular coolant passage members are disposed above the fuel assemblies so as to receive the heated coolant discharged from the fuel assemblies, so that the heated coolant flows upwardly through the tubular coolant passage members. The tubular coolant passage members provide a chimney effect which enhances the upward flow of the coolant and, hence, increases the flow rate of coolant flowing through the reactor core. In consequence, a greater cooling effect is obtained and the range of power controllable by the control rods is widened. In consequence, the construction of the reactor is simplified and the size is decreased due to elimination of coolant recycling system in the reactor vessel.

17 Claims, 9 Drawing Figures

NUCLEAR REACTOR

This is a continuation of application Ser. No. 344,222, filed Jan. 28, 1982, now abandoned.

BACKGROUND OF THE INVENTION

The present invention relates to a nuclear reactor and, more particularly, to a novel construction of nuclear reactor which can provide greater flow rate of coolant flowing through the reactor core. The construction of a nuclear reactor in accordance with the invention is suitable for use particularly in small-sized nuclear reactors.

Most nuclear reactors commercially operating presently are light-water nuclear reactors of large capacities having electric power output of an order of 400 MWE. A boiling water reactor, which is known as a kind of light-water reactor, has a pressure vessel and a reactor core disposed in the pressure vessel. The reactor core includes a multiplicity of fuel assemblies. Control rods for controlling the power of the reactor are adapted to be inserted into the reactor core from the lower side of the reactor core. The boiling water reactor has also a recycling system for recycling a coolant through the reactor core and serving also as means for effecting a fine adjustment of the power of the nuclear reactor. The steam generated in the pressure vessel of the nuclear reactor is introduced into a steam turbine to drive the latter and is then condensed in a condenser. The condensate is then recycled as the coolant into the pressure vessel.

Another typical example of a light-water reactor is a pressurized water reactor which is constituted by a pressure vessel containing a reactor core having a multiplicity of fuel assemblies, a steam generator and a primary cooling system which forms a closed loop including the pressure vessel and the steam generator. The hot coolant after being heated in the reactor core is introduced into the steam generator through the pipe of the primary cooling system to make a heat exchange with feed water fed into the steam generator. The coolant, the temperature of which has been lowered as a result of the heat exchange, is returned from the steam generator into the pressure vessel through the pipe of the primary system. On the other hand, the feed water is evaporated to become steam as a result of the heat exchange. The steam is introduced into a turbine to drive the latter and, thereafter, condensed in a condenser. The condensate is returned as the feed water to the steam generator.

The capacity of the light-water nuclear reactors is getting larger year by year. On the other hand, however, there is an increasing demand for nuclear reactors of smaller capacities having electric power output of less than 200 MeW, as the power source of small-scale power generating equipment and the heat source for a district heating system.

SUMMARY OF THE INVENTION

Accordingly, an object of the invention is to provide a nuclear reactor which is improved to provide greater flow rate of coolant flowing through the reactor core.

Another object of the invention is to provide a nuclear reactor which permits an easier refueling.

Still another object of the invention is to provide a nuclear reactor which can prevent unfavorable vibration of control rods.

To these ends, according to the invention, there is provided a nuclear reactor having a reactor vessel, a reactor core disposed in the reactor vessel and including a multiplicity of fuel assemblies, a plurality of control rods adapted to be inserted into the reactor core, and a plurality of control rod driving devices adapted for driving the control rods, characterized in that it comprises a plurality of tubular coolant passage members disposed above the fuel assemblies in the reactor core, the tubular coolant passage members extending upwardly so that the coolant coming out of the fuel assemblies is introduced into the tubular members.

DESCRIPTION OF THE PREFERRED EMBODIMENT

Figure 1:
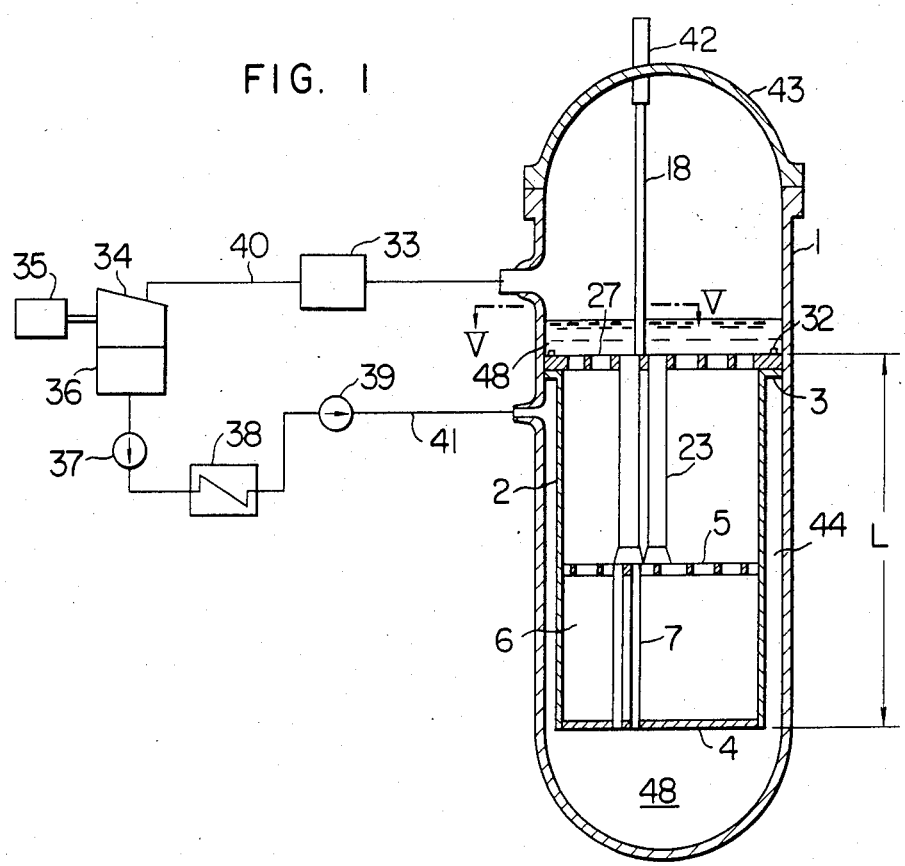
FIG. 1 is a schematic system diagram of a boiling water reactor constructed in accordance with a preferred embodiment of the invention.

A preferred embodiment of the invention, applied to a boiling water reactor, will be described hereinunder with reference to FIGS. 1 to 8. FIG. 1 schematically shows the system of a small-sized boiling water reactor having an electric power output of less than 200 MWE. This boiling water reactor has a reactor vessel 1, an internal shroud 2 mounted in the reactor vessel 1, a reactor core 6 disposed in the internal shroud 2 and having a multiplicity of fuel assemblies 7, and a plurality of tubular coolant passage members 23 disposed above the fuel assemblies 7. The internal shroud 2 is fixed to the inner surface of the reactor vessel 1 through an annular plate 3. A lower core supporting plate 4 and an upper core supporting plate 5 are secured to the inner surface of the internal shroud 2. As will be best seen from FIG. 2, the lower core supporting plate 4 and the upper core supporting plate 5 support the lower and upper ends of the fuel assemblies 7.

Each fuel assembly 7 has an upper tie plate 8, lower tie plate 9, fuel rods 10 and a channel box 12. The fuel rods 10 are secured at their upper and lower ends to the upper tie plate 8 and the lower tie plate 9, respectively. A plurality of spacers arranged in the axial direction bundle the multiplicity of fuel rods 10 in such a manner that a passage of coolant is formed between each adjacent fuel rods. The channel box 12 surrounds the bundle of the fuel rods 10, and is secured to the upper tie plate 8. Pads 13 are provided on the upper ends of two side surfaces of the channel box 12. A multiplicity of pellets (not shown) rich in uranium 235 is charged in each fuel rod 10. Each fuel assembly 7 is detachably secured at its lower end to the lower core supporting plate 4. As will be seen from FIG. 3, four fuel assemblies 7 are inserted into each of square holes 45 formed in the grid-like upper core supporting plate. The four fuel assemblies 7 received by each square hole 45 is pressed against the upper core supporting plate 5 with the pads 13 of adjacent fuel assemblies 7 contacting each other, so that the lateral oscillation of upper portions of fuel assemblies 7 is prevented.

A multiplicity of tubular coolant passage members 23 are disposed above the core 6. As will be seen from FIGS. 2, 3 and 4, each tubular coolant passage member 23 receives the upper ends of four fuel assemblies 7 which are arranged around each point 46 of crossing of the upper core supporting plate 5. Namely, the multiplicity of fuel assemblies 7 are grouped into a plurality of groups each having four fuel assemblies 7, the upper ends of fuel assemblies of each group being received by a common tubular coolant passage member 23. Each tubular coolant passage member 23 is detachably secured at its lower end to the upper side of the upper core supporting plate 5, and extends upwardly therefrom in the axial direction of the fuel assemblies 7. The tubular coolant passage member 23 has a square cross-section the area of which is varied along the length of the member 23, so that the tubular coolant passage member 23 has three portions of different cross-sectional areas: namely, an expanded portion 24, flared portion 25 and a contracted portion 26. More specifically, the expanded portion 24 constitutes the lowermost portion of the tubular coolant passage member 23 and connected to the contracted portion 26 through the intermediate flared portion 25. The lowermost expanded portion 24 of the tubular coolant passage member 23 surrounds the upper ends of four fuel assemblies 7 of a group. The contracted portion 26 of the tubular coolant passage member 23 extends upwardly and is welded at its upper end to a grid portion 28 of a coolant passage supporting plate 27.

Figure 5:
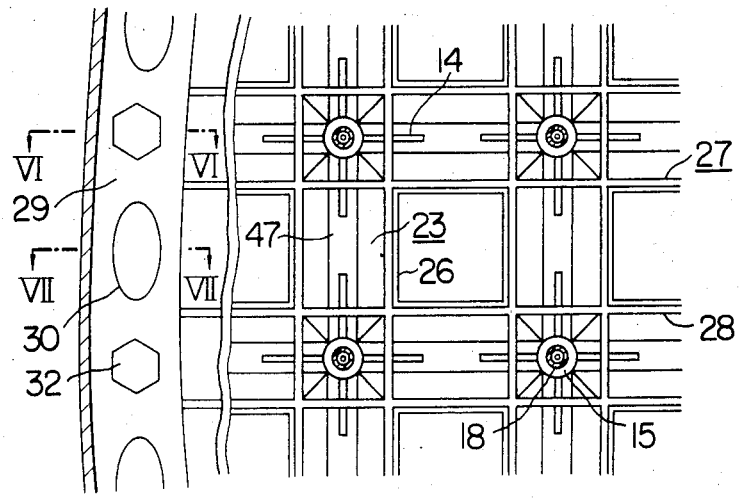
FIG. 5 is a sectional view of the reactor vessel of the boiling water reactor taken along the line V—V of FIG. 1.
Figure 2:
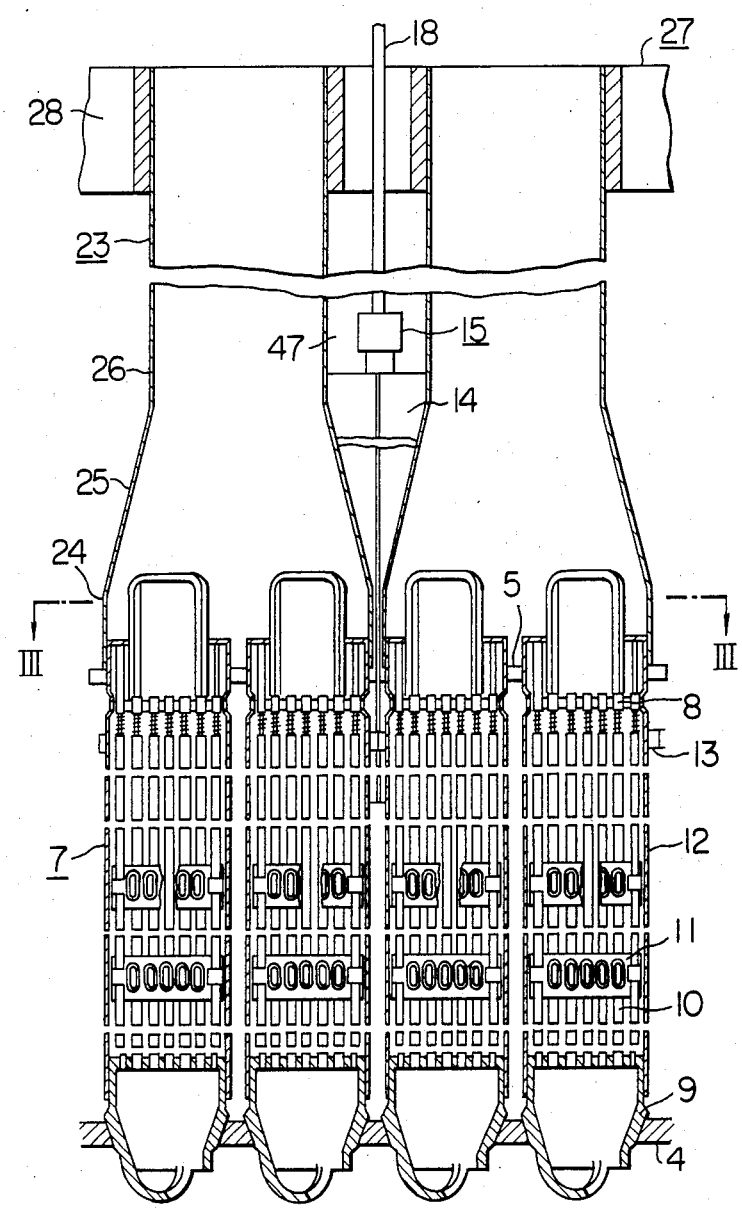
FIG. 2 is a vertical sectional view of the reactor core in the boiling water reactor shown in FIG. 1, showing the detail of construction of the reactor core.
Figure 3:
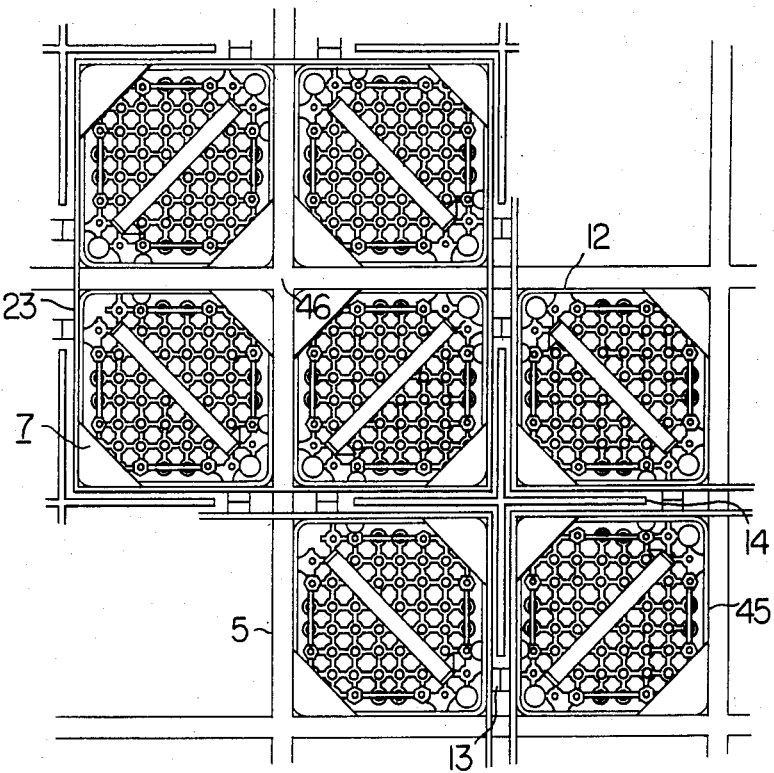
FIG. 3 is a sectional view taken along the line III—III of FIG. 2.
Figure 4:
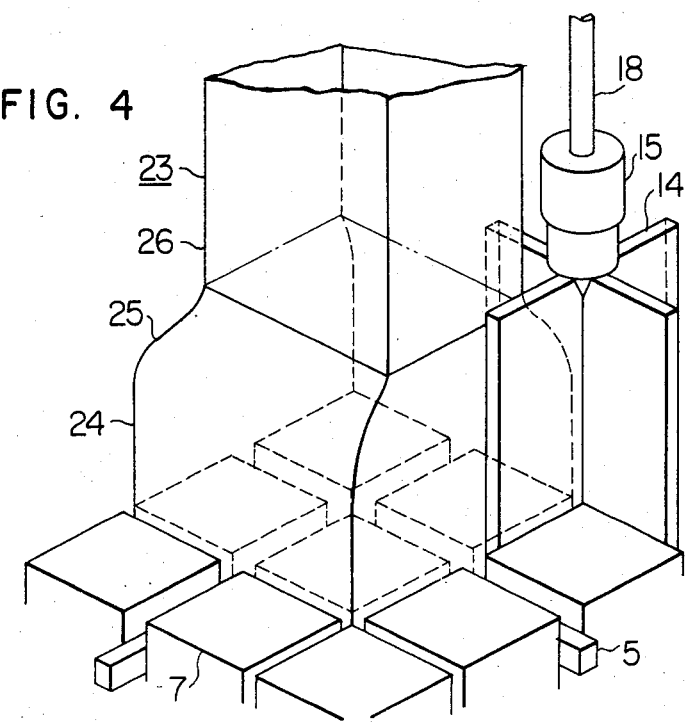
FIG. 4 is a perspective view of the lower end portion of a tubular coolant passage member in the reactor core shown in FIG. 2.
Figure 6:
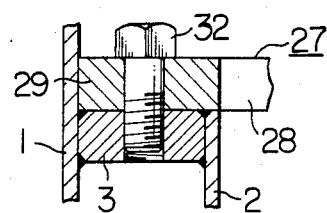
FIG. 6 is a sectional view taken along the line VI—VI of FIG. 5.
Figure 7:
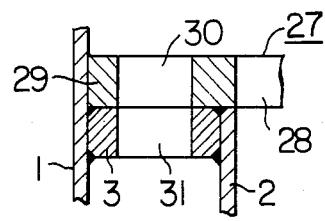
FIG. 7 is a sectional view taken along the line VII—VII of FIG. 5.
Figure 8:
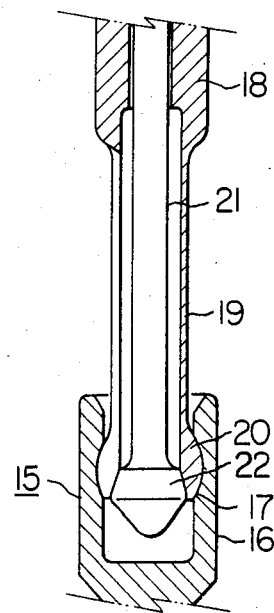
FIG. 8 is a vertical sectional view of a construction for connecting a control rod to a control rod driving device.

As will be seen from FIG. 5, the coolant passage supporting plate 27 has a peripheral annular plate constituting a flange 29 and the central grid portion 28 welded to the flange portion 29. The coolant passage supporting plate 27 is mounted on the annular plate 3 mentioned before. Namely, as will be seen from FIG. 6, the flange 29 of the coolant passage supporting plate 27 is detachably secured to the annular plate 3 by means of a plurality of bolts 32. A plurality of coolant circulation holes 30 are formed in the flange 29. At the same time, as will be seen from FIG. 7, a plurality of coolant circulation holes 31 are formed in the annular plate 3 to take positions corresponding to the coolant circulation holes 30 in the flange 29.

Each control rod 14 having a cross-shaped cross-section is received by the gap 47 formed between adjacent tubular coolant passage members 23 in the reactor vessel 1. That is, the control rods 14 are adapted to be inserted into the core 6 from the upper side. Since the pads 13 through which the fuel assemblies are pressed to each other are disposed in the vicinity of the upper core supporting plate 5, the pads 13 do not impede the insertion of the control rod into the space between adjacent fuel assemblies. The insertion of the control rod 14 into the space surrounded by four adjacent fuel assemblies is afforded also by the arrangement in which each tubular coolant passage member 23 is disposed above four fuel assemblies adjacent to each crossing point 46 of the grid of the upper core supporting plate 5. Namely, if the tubular coolant passage member 23 is disposed above four fuel assemblies other than the above-mentioned fuel assemblies 7, the insertion of the control rod 14 is impossible because it is obstructed by the upper core supporting plate 5. The pressing of fuel assemblies 7 in the hole 45 of the upper core supporting plate 5 by means of the pads 13 serves to permit the insertion of the control rod 14 into the space surrounded by the four fuel assemblies 7. The insertion of the control rod 14 is impossible in the case where fasteners are provided on opposing corners of four fuel assemblies 7 in a common hole 45 of the upper core supporting plate 5 as in the case of boiling water reactors having large power output.

Each control rod 14 is connected by means of a gripper 15 to an extension shaft 18 of a control rod driving device 42 mounted on the upper lid 43 of the pressure vessel 1. As will be seen from FIG. 8, the gripper 15 is constituted by a socket 16 provided on the upper end of the control rod 14, a finger 19 secured to the lower end of the extension rod 18 and a cam 22 provided at the lower end of a cam shaft 21 extending through the extension shaft 18. The connection between the control rod 14 and the control rod driving device 42 is achieved by inserting the end 20 of the finger 19 into the socket 16 after lowering the cam shaft 21, and then raising the cam shaft 21 upwards. Namely, as the cam shaft 21 is pulled upwardly, the cam 22 acts to urge the end 20 of the finger outwardly to fit it in a recess 17 provided in the inner surface of the socket 16, thus completing the connection between the control rod 14 and the control rod driving device 42, so that the control rod 14 can be inserted into and withdrawn from the core 6 as desired by the operation of the control rod driving device 42. The gripper 15 has a diameter greater than the width of the space between adjacent fuel assemblies 7. The presence of the contracted portion 26 in the tubular coolant passage member 23 enlarges the width of the space 46 to facilitate the movement of the gripper 15 in the space 46. Namely, the undesirable collision of the gripper 15 with the tubular coolant passage member 23 is effectively avoided.

The increase in the power of the boiling water reactor of this embodiment is obtained by withdrawing the control rods 14 from the reactor core 6. The steam produced in the reactor vessel 1 is discharged from the latter and is introduced through a main steam pipe 40 to a turbine 34 to which connected is an alternator 35. Any water droplets contained by the steam is removed from the steam as the latter flows through a steam separator 33 disposed at an intermediate portion of the main steam pipe 40. The water separated from the steam by the steam separator 33 is introduced into a condenser 36 through a pipe (not shown) to merge with later-mentioned condensate in the condenser 36. The steam expanded through the turbine to drive the latter is discharged to the condenser 36 and condensed by cooling to become the condensate. The condensate is then fed back, as the coolant, to the reactor vessel 1 through a feedwater pipe 41 having a condensate pump 37, feed water heater 38 and a feedwater pump 39. The coolant is heated by the feed water heater 38 up to a comparatively low temperature of 180° to 200° C. by the feed water heater 38. The coolant of such a low temperature and, hence, having a large density flows down through an annular passage 44 formed between the inner peripheral surface of the reactor vessel 1 and the internal shroud 2 to reach a lower plenum 48. The coolant then flows into each fuel assembly 7 through the lower tie plate 9 and flows upwardly while cooling the fuel rod 10. In consequence, the coolant is heated and partially changed into steam. The two-phase flow consisting of the liquid coolant and the vaporized coolant is discharged from each fuel assembly 7 and is introduced into corresponding tubular coolant passage member 23 to flow upwardly through the latter. The steam discharged from the tubular coolant passage members 23 is collected in an upper gas plenum 48. The steam, which has a temperature of about 280° C. in this state, is then fed to the main steam pipe 40. On the other hand, the liquid coolant discharged from the tubular coolant passage members 23 into the upper gas plenum 48, also having the temperature of about 280° C., flows through the coolant circulation holes 30 and 31 to flow down along the annular passage 44 together with the coolant which has been supplied through the feed water pipe 41. Thus, a path for recirculating the coolant is formed in the reactor vessel 1 to include the annular passage 44, lower plenum 48, fuel assemblies 7, tubular coolant passage members 23 and the coolant circulation holes 30 and 31.

According to the invention, a remarkable increase in the flow rate of coolant in the core 6, i.e. through the fuel assemblies 7, is attained thanks to the provision of the tubular coolant passage 23. Namely, the density $\rho_1$ of the two-phase flow in the tubular coolant passage member 23, coming directly from the fuel assemblies 7, is smaller than the density $\rho_2$ of the coolant flowing down along the annular passage 44. This difference in the density serves to promote the natural recycling of the coolant in the reactor vessel through the coolant recycling path mentioned above, so that the flow rate of the coolant flowing through the reactor core 6 is increased advantageously. This in turn increases the effect of cooling of the fuel assemblies 7 and widens the range of power controllable by the control rods.

Figure 9:
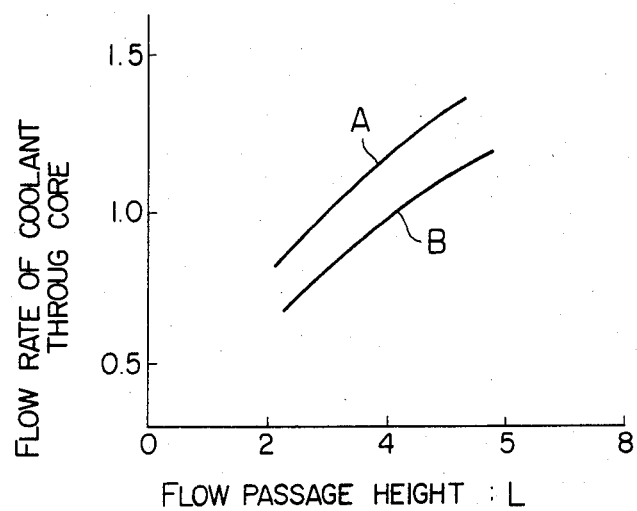
FIG. 9 is a chart showing a relationship between flow passage height L and the flow rate of coolant in the reactor core.

FIG. 9 shows quantitatively the increase in the flow rate of the coolant through the reactor core caused by the provision of the tubular coolant passage members 23. More specifically, in FIG. 9, the curve A shows the change in the flow rate of coolant flowing through the reactor core 6, as observed when the reactor has the tubular coolant passage members 23 disposed above the reactor core 6, in relation to the flow passage height L which is, in this case, the vertical distance between the lower surface of the lower core supporting plate 4 and the upper ends of the tubular coolant passage members 23 as shown in FIG. 1. In contrast, the curve B shows the change in the coolant flow rate as observed when the reactor has no tubular coolant passage member so that the internal shroud solely projects above the core 6, in relation to the flow passage height L which is in this case the vertical distance between the lower surface of the lower core supporting plate 4 and the upper end of the internal shroud 2. In both cases, the flow rate is increased as the flow passage heights L are increased. As will be understood from a comparison between two curves A and B, the flow rate of the coolant through the reactor core 6 is much greater in the case where the tubular coolant passage members 23 are provided than in the case where no tubular coolant passage member 23 is provided. This is attributable to the fact that the tubular coolant passage members 23 having smaller cross-sectional area provides a greater chimney effect than that provided by the internal shroud 2 having larger cross-sectional area. The tubular coolant passage members 23, which serve to enhance the natural recycling force of the coolant in the reactor vessel, eliminate the necessity for the specific recycling system including a recycling pipe and recycling pump essential in the conventional boiling water reactors of large capacity. Thus, according to the invention, it is possible to obtain a compact, small-sized boiling reactor having small rated capacity of less than 200 MWE.

All part of the steam generated in the fuel assemblies 7 is introduced into the tubular coolant passage members 23. Namely, there is no leak of the steam into the space between the adjacent tubular coolant passage members 23 in which the control rod 14 is positioned. A single-phase flow of coolant supplied through the lower core supporting plate 4 flows at a small flow rate in the space between adjacent fuel assemblies 7 and the space 46 which receive the control rod 14. Therefore, the unfavourable vibration of the control rods 14 which may, for otherwise, be caused by the two-phase flow coming out of the fuel assemblies 7 is completely avoided although the control rods 14 are adapted to be inserted into the reactor core 6 from the upper side of the core contrary to the common sense of design of boiling water reactors. In consequence, the damage of the control rods due to vibration is effectively avoided and the longer life of the control rod is ensured.

In the boiling water reactor of this embodiment, the refueling of assembles 7 is conducted in accordance with the following procedure. After shutting down of the nuclear reactor, the control rods 14 inserted into the reactor core 6 are disconnected from the control rod driving devices 42. This disconnection is made by withdrawing the end 20 of the finger from the socket 16 by moving the extension shaft 18 upwardly after depressing the cam shaft 21. Thereafter, the lid 43 is demounted from the reactor vessel 1. Then, the coolant passage supporting plate 27 is detached from the annular plate 3 after loosening the bolts 32. The coolant passage supporting plate 27 is withdrawn from the reactor vessel 1 together with the tubular coolant passage members 23. In this state, the fuel assemblies 7 in the reactor core can be observed and checked from the upper side thereof. The renewal of the fuel assemblies 7 is conducted by means of a refueling machine (not shown) stationed above the reactor vessel 1. After the refueling, the coolant passage supporting plate 27 is secured again to the annular plate 3 with the lower ends of the tubular coolant passage members 23 receiving the upper ends of corresponding fuel assemblies 7. Finally, the lid 43 is secured to the reactor vessel 1 and the control rods 14 are connected to the control rod driving devices 42.

The renewal of the control rods 14 can be conducted substantially in the same way as the renewal of the fuel assemblies 7.

The present invention can be applied not only to the described boiling water reactor but also to other types of nuclear reactors, particularly pressurized water reactors. In such an application, a plurality of tubular coolant passage members are disposed above the fuel assemblies above the fuel assemblies of the reactor core of the pressurized water reactor, as in the case of the described embodiment applied to a boiling water reactor. Since in the pressurized water reactor the control rods are inserted into fuel assemblies, the pressurized water reactor embodying the invention should be designed and constructed to permit the control rods to be inserted into the fuel assemblies through the tubular coolant passage members. This arrangement constitutes a sole point of difference between the pressurized water reactor and the boiling water reactor embodying the present invention. In the pressurized water reactor, no steam is generated so that only the coolant of high temperature in the liquid state flows upwardly through the tubular coolant passage members. This hot coolant having smaller density than the coolant supplied by the feedwater pump naturally enhances the recycling flow and, hence, increases the flow rate of the coolant flowing through the reactor core, although the chimney effect is somewhat small as compared with the case of the boiling water reactor in which the two-phase flow consisting of liquid coolant and steam flows upwardly through the tubular coolant passage members.

As has been described, according to the invention, it is possible to obtain a greater flow rate of coolant flowing through the reactor core by quite a simple construction.

What is claimed is:

1. A nuclear reactor having a reactor vessel for being supplied with a coolant, a reactor core disposed in said reactor vessel, a plurality of adjacent fuel assemblies spaced from one another in said reactor core, a plurality of control rods arranged for being inserted into spaces between preselected adjacent fuel assemblies, and a plurality of control rod driving devices installed on said reactor vessel for driving said control rods, a two-phase coolant flow being discharged from said fuel assemblies, characterized by means for preventing the two-phase coolant flow from contacting and control rods, said preventing means including a plurality of adjacent tubular coolant passage members spaced from one another and being disposed above said fuel assemblies so as to partially surround each control rod in the partially inserted position, said tubular coolant passage members extending upwardly so that the two-phase coolant flow discharged from said fuel assemblies is introduced only into said tubular coolant passage members, said tubular coolant passage members being provided with a cross section which decreases in the upward direction, each tubular coolant passage member covering a predetermined number of adjacent fuel assemblies, said control rods being arranged for insertion into the spaces between the preselected adjacent fuel assemblies through the spaces formed between said adjacent tubular coolant passage members.

2. A nuclear reactor as claimed in claim 1, wherein said tubular coolant passage members are detachably secured to said fuel assemblies.

3. A nuclear reactor as claimed in claim 2, wherein a supporting member to which said tubular coolant passage members are connected is detachably secured to said reactor vessel.

4. A nuclear reactor as claimed in claim 1, wherein each tubular coolant passage member is secured to said predetermined of fuel assemblies.

5. A nuclear reactor as claimed in claim 1, wherein said reactor vessel has a recyling path for the coolant, said recycling path including means for introducing the coolant discharged from said tubular coolant passage members to the lower side of said fuel assemblies and then into said fuel assemblies.

6. A nuclear reactor as claimed in claim 1, wherein said predetermined number of adjacent fuel assemblies is four, and each tubular coolant passage member has a first cross section at an end proximate to said four adjacent fuel assemblies for receiving the two-phase coolant flow discharged from said four adjacent fuel assemblies, and a second cross section smaller than said first cross section at an outlet end thereof.

7. A nuclear reactor as claimed in claim 6, wherein each tubular coolant passage member comprises a lower portion of said first cross section, an upper portion of said second cross section, and an intermediate portion of a gradually decreasing cross section interconnecting said lower and upper portions.

8. A nuclear reactor as claimed in claim 1, wherein each tubular coolant passage member has an inlet and an outlet end, with the portions forming the tubular coolant passage member being non-perforated portions.

9. A boiling water reactor comprising a reactor vessel for being supplied with a coolant, a reactor core disposed in the reactor vessel and including a plurality of adjacent fuel assemblies spaced from one another, a plurality of control rods arranged for insertion into the spaces between preselected adjacent fuel assemblies, a plurality of control rod driving devices for driving the control rods, a two-phase coolant flow being discharged from the fuel assemblies, and means for preventing the two-phase coolant flow discharged from the fuel assemblies from contacting the control rods, the preventing means including a plurality of adjacent tubular coolant passage members spaced from one another and being disposed above the fuel assemblies so as to partially surround each control rod in the partially inserted position, said tubular coolant passage members extending upwardly so that the coolant flow discharged from the fuel assemblies is introduced only into the tubular coolant passage members, said tubular coolant passage members being provided with a cross section which decreases in the upward direction, each tubular coolant passage member covering a predetermined number of adjacent fuel assemblies, the control rods being arranged for insertion into the spaces between the preselected adjacent fuel assemblies through the spaces formed between adjacent tubular coolant passage members.

10. A boiling water reactor as claimed in claim 9, wherein said predetermined number of adjacent fuel assemblies is four, each tubular coolant passage member having a first cross section at an end proximate to the four adjacent fuel assemblies for receiving the two-phase coolant flow discharged from the four adjacent fuel assemblies, and a second cross section smaller than the first cross section at an outlet end thereof.

11. A boiling water reactor as claimed in claim 10, wherein each tubular coolant passage member comprises a lower portion of the first cross section, and upper portion of the second cross-section, and an intermediate portion of gradually decreasing cross section interconnecting the lower and upper portions.

12. A boiling water reactor as claimed in claim 11, wherein a supporting member to which the tubular coolant passage members are attached includes means for detachably securing the supporting member to the reactor vessel.

13. A boiling water reactor comprising a reactor vessel for being supplied with a coolant, a reactor core disposed in the reactor vessel and including a plurality of adjacent fuel assemblies disposed in lattice-like form and having a square cross section, said fuel assemblies being disposed adjacent to and spaced from one another, a plurality of cross-shaped rods arranged for being inserted into the reactor core into space between preselected adjacent fuel assemblies, a plurality of control rod driving devices for driving the control rods, the fuel assemblies discharging a two-phase flow of coolant therefrom, and means for preventing the two-phase flow of coolant discharged from the fuel assemblies from contacting the control rods, the preventing means including a pluraltiy of adjacent tubular coolant passage members adjacent to and spaced from one another being disposed above the fuel assemblies, the tubular coolant passage members extending upwardly so that the two-phase coolant flow discharged from the fuel assemblies is introduced only into the tubular coolant passage members, the tubular coolant passage members having a cross section which decreases in the upper direction, each of the tubular coolant passage members covering four adjacent fuel assemblies respectively surrounded by portions of four of said cross-shaped control rods in the partially inserted position thereof.

14. A boiling water reactor as claimed in claim 13, wherein the tubular coolant passage members are connected to an upper reactor core supporting plate at the top thereof.

15. A boiling water reactor as claimed in claim 13, wherein the control rods are arranged for insertion into spaces between the preselected adjacent fuel assemblies to spaces formed between adjacent tubular coolant passage members, each tubular coolant passage member having a first cross section at an end proximate to the four adjacent fuel assemblies for receiving the two-phase coolant flow discharged from the four adjacent fuel assemblies, and a second cross section smaller than the first cross section at an outlet end thereof.

16. A boiling water reactor as claimed in claim 15, wherein each tubular coolant passage member comprises a lower portion of the first cross section, an upper portion of the second cross section, and an intermediate portion of gradually decreasing cross section interconnecting the lower and upper portions.

17. A boiling water reactor as claimed in claim 16, wherein a supporting member to which the tubular coolant passage members are attached includes means for detachably securing the supporting member to the reactor vessel.

* * * * *